United States Patent [19]

Traub

[11] Patent Number: 4,570,944
[45] Date of Patent: Feb. 18, 1986

[54] SEAL ASSEMBLY WITH REDUCED WEAR LOW PRESSURE SEALING RING

[75] Inventor: Henry A. Traub, Pacific Palisades, Calif.

[73] Assignee: W. S. Shamban & Company, Santa Monica, Calif.

[21] Appl. No.: 734,565

[22] Filed: May 15, 1985

[51] Int. Cl.⁴ .......................... F16J 15/24; F16J 15/32
[52] U.S. Cl. ..................................... 277/121; 277/176; 277/177; 277/194; 277/205; 277/188 A
[58] Field of Search .......................... 277/115, 117–122, 277/144, 145, 152, 153, 170–172, 165, 176, 177, 188 R, 188 A, 190, 191, 193, 194, 205

[56] References Cited

U.S. PATENT DOCUMENTS

| | | | |
|---|---|---|---|
| 3,718,338 | 2/1973 | Traub | 277/176 X |
| 3,765,690 | 10/1973 | Sievenpiper | 277/121 |
| 3,848,880 | 11/1974 | Tanner | 277/176 |
| 4,027,816 | 6/1977 | Slator et al. | 277/205 X |
| 4,053,163 | 10/1977 | Vegella | 277/205 X |
| 4,053,166 | 10/1977 | Domkowski | 277/205 X |
| 4,231,578 | 11/1980 | Traub | 277/121 |
| 4,268,045 | 5/1981 | Traub | 277/121 |

FOREIGN PATENT DOCUMENTS

| | | | |
|---|---|---|---|
| 923013 | 4/1963 | United Kingdom | 277/176 |
| 1455141 | 11/1976 | United Kingdom | 277/121 |

*Primary Examiner*—Robert S. Ward
*Attorney, Agent, or Firm*—Poms, Smith, Lande & Rose

[57] ABSTRACT

An improved low pressure seal ring configuration, which is adapted for use in combination with a high pressure seal ring to provide a seal assembly which is capable of sealing first and second relatively reciprocating surfaces at both high and low pressures. The low pressure seal ring is designed to be located between the high pressure seal ring and the wall of the groove in which the seal assembly is mounted. The low pressure seal ring exerts pressure against the high pressure seal to provide desired high pressured sealing. The low pressure seal also includes a seal lip which has a tip that extends over the edge of the high pressure seal to provide low pressure sealing. The low pressure seal lip includes a bottom surface which is V-shaped and terminates in an apex. The outer portion of the seal lip includes an annular lobe having a second annular apex. The seal lip is designed to provide increased localized annular sealing pressures due to the apexes along with reduced lateral movement of the seal lip during seal assembly use in order to reduce abrasion and wear of the seal lip.

8 Claims, 3 Drawing Figures

SEAL ASSEMBLY WITH REDUCED WEAR LOW PRESSURE SEALING RING

BACKGROUND OF THE INVENTION

The present invention relates generally to multi-element sealing assemblies for effecting a seal between relatively moveable parts in both the static and dynamic mode at both high and low pressures. More particularly, the present invention relates to an improved low pressure seal ring designed for use in such multi-element seals.

Numerous different seal configurations have been designed for providing a seal between relatively reciprocating surfaces, such as pistons and the cylinders housing the pistons, under both high and low pressure conditions. In my prior U.S. Pat. Nos. 4,231,578 and 4,268,045, a number of different multi-element seal assembly embodiments are disclosed. The seals assemblies are designed to provide an effective seal during both high pressure and low pressure conditions. The contents of these two patents are hereby incorporated by reference.

The multi-element seals disclosed in my prior patents generally include a high pressure seal ring and a low pressure seal ring. The high pressure seal ring is typically made from materials such as polytetrafluoroethylene. The low pressure seal ring is typically made from an elastomeric material such as rubber or other suitable synthetic or natural material having the same elastic properties as rubber. Both the high pressure seal ring and the low pressure seal ring are conventionally housed within a groove located in one of the reciprocating surfaces. The low pressure ring typically seats against the bottom of the groove, with the high pressure seal ring being located between the low pressure seal ring and the reciprocating surface to be sealed.

The low pressure seal ring is designed to provide a radial biasing force against the high pressure seal ring to insure adequate sealing at high pressures. In addition, the low pressure seal ring is Y-shaped to provide a seal lip portion or wiper arm which extends out past the end of the high pressure seal to provide direct contact and low pressure sealing between the low pressure seal ring and the reciprocating surface to be sealed.

In my above referenced prior patents, the radial width of the low pressure seal ring is oversized so that the low pressure seal ring provides a compressive force against the high pressure seal ring when the low pressure seal ring is compressed within the seal groove. Additionally, the low pressure seal ring is designed to be over-sized so that a radial compressive force is exerted against the seal lip or wiper arm to thereby promote sealing at low pressures. Although the use of an oversized low pressure seal ring provides desirable biasing of the seal lip against the reciprocating surface, it was found that the particular over-sized configurations being used may result in excessive wear of the tip portion of the low pressure seal ring lip. Accordingly, there is a continuing need to provide new low pressure seal ring configurations having reduced wear characteristics.

Much of the wear in prior low pressure seal rings is due to the abrasion of the seal ring lip as it is extended away from and contracted against the high pressure seal ring during piston reciprocation. It would be desirable to provide a low pressure seal ring which provides the same sealing characteristics as the wiper arm of the prior Y-shaped low pressure seal rings while overcoming the problems associated with undesirable abrasion of the rubber lip by the high pressure seal ring.

SUMMARY OF THE INVENTION

In accordance with the present invention, a low pressure seal ring is provided, which has a cross-sectional structure designed to provide adequate sealing at low pressures, while being resistant to abrasion and wear when the seal ring is used in a seal assembly in combination with a high pressure sealing ring.

The low pressure seal ring in accordance with the present invention is an annular elastomeric seal ring body, which includes a seal lip portion having a bottom seal lip surface adapted to be supported by the seal lip support surface of a high pressure seal ring. The bottom seal lip surface includes an annular sealing tip at its left end, which is designed to extend out past and adjacent to the left end of the sealing lip support surface of the high pressure seal ring to provide sealing contact between the low pressure seal ring and a piston or first reciprocating surface.

The annular seal ring body seal lip portion also includes a top seal lip surface located radially above the seal tip. As another feature of the present invention, the top seal lip surface includes an annular lobe which also provides increased localized pressure contact between the seal ring body and the cylinder wall or second reciprocating surface.

The annular seal ring body further includes a seal body portion having a left part integral with the seal lip portion and a right part. The seal body portion has a cross-sectional shape which is adapted to be positioned between the bottom of the cylinder groove in which the seal assemble is housed and the seal body support surface of the high pressure seal ring.

As another feature of the present invention, the low pressure seal ring bottom seal lip surface includes a first inclined surface adapted to contact the seal lip support surface of the high pressure seal ring and a second inclined surface which meets the first inclined surface to form a bottom seal lip surface having a V-shaped cross section with the first pressure ridge being located at the apex of the V-shaped bottom seal lipped surface.

The above discussed and many other features and attendant advantages of the present invention will become apparent as the invention becomes better understood by reference to the following detailed description when considered in conjunction with the accompanying drawings.

DETAILED DESCRIPTION OF THE INVENTION

Figure 1:
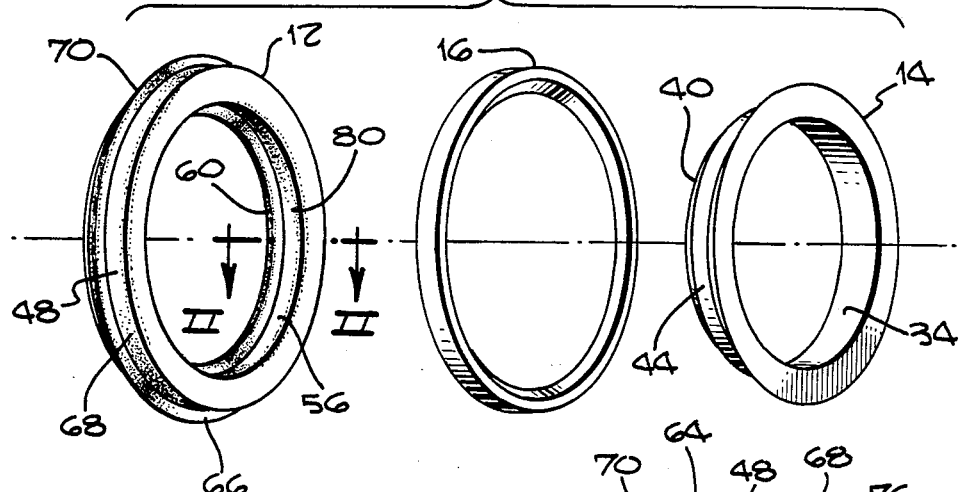
FIG. 1 is an exploded view of a preferred seal assembly in accordance with the present invention showing the low pressure seal, cam ring and high pressure seal.
Figure 3:
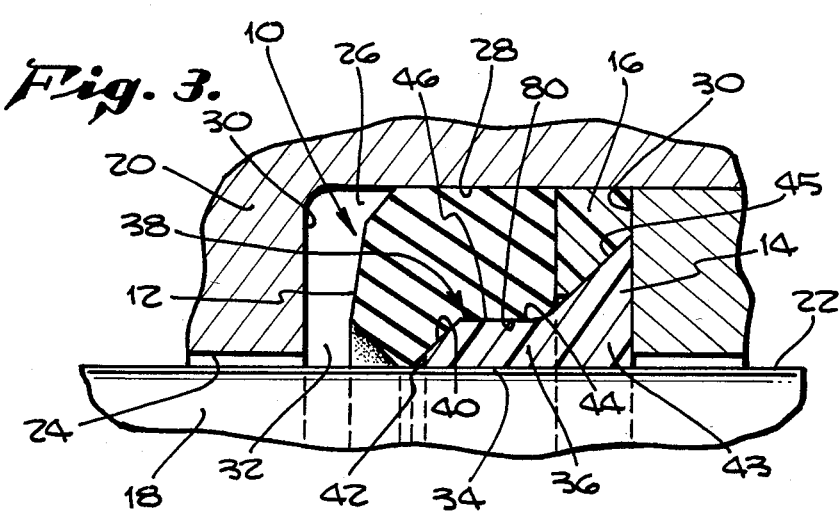
FIG. 3 is a sectional view of the preferred seal ring assembly shown in FIG. 1, which is mounted within the groove of a cylinder wall for sealing of a reciprocating piston located therein.

A preferred examplary seal assembly is shown generally at 10 in FIGS. 1 and 3. The seal assembly 10 includes a low pressure seal ring 12, high pressure seal ring 14 and a cam ring 16. The seal assembly 12 is designed for use in sealing relatively reciprocating parts such as cylinders and pistons commonly used in hydraulic devices and equipment.

Referring to FIG. 3, the seal assembly 10 is shown in position for providing a seal between piston 18 and cylinder 20. The outer surface 22 of cylinder 18 defines a first reciprocating surface. The inner surface 24 of cylinder 20 defines a second reciprocating surface. As is conventional, the first reciprocating surface 22 slides back and forth relative to cylinder 20 along to the axis of piston 18. The cylinder 20 includes groove 26 in which the seal assembly 10 is housed. The groove 26 includes bottom surface 28, side surfaces 30 and an open top 32. The bottom surface 28 and side surfaces 30 of groove 26 form part of the second reciprocating surface.

During relative reciprocal movement of piston 18 and cylinder 20, the seal assembly 10 will be subjected to a wide range of pressures ranging from relatively high pressures of 5,000 PSI and above, down to relatively low pressures in the range of a few PSI. At high pressures, the majority of sealing action on the piston 18 is provided by seal assembly 10 is due to the high pressure seal ring 14. At lower pressures, the majority of the sealing action on the piston 18 provided by the seal assembly 10 is due to the low pressure seal ring 12. At intermediate pressures, both the high pressure seal ring 14 and low pressure seal ring 12 contribute to the sealing action provided by the seal assembly 10.

The high pressure seal ring 14 includes an inner sealing surface 34 for sealing contact with the piston outer surface 22. The high pressure seal ring 14 also includes a low pressure seal ring support portion 36. The low pressure seal ring support protion 36 includes an outer low pressure seal ring support surface shown generally at 38. The low pressure seal ring support surface 38 includes an inclined seal lip support surface 40, which tapers inward towards the inner sealing surface 34. The seal lip support surface 40 includes a left end which terminates near the inner sealing surface 34 to provide a high pressure seal apex 42.

The high pressure seal ring 14 further includes a right end portion 43, which is designed to contact the right wall 30 of groove 26. The high pressure seal ring 14 is similar in design and operation to the high pressure seal rings disclosed in my two prior patents which have been previously incorporated by reference. The high pressure seal ring 15 is made from any suitable high pressure seal material such as polytetrafluroethylene.

The low pressure seal ring support surface 38 on the high pressure seal ring 14 also includes an axial low pressure seal body support surface 44. The seal body support surface 44 is substantially parallel to the high pressure seal ring inner sealing surface 34. The seal body support surface 44 includes a left end 46 which meets the right end of the seal lip support surface 40. The seal body support surface 44 terminates at the right end where it meets inclined surface 45. Inclined surface 45 is adapted to interact with the cam ring 16 as will be described below.

Figure 2:
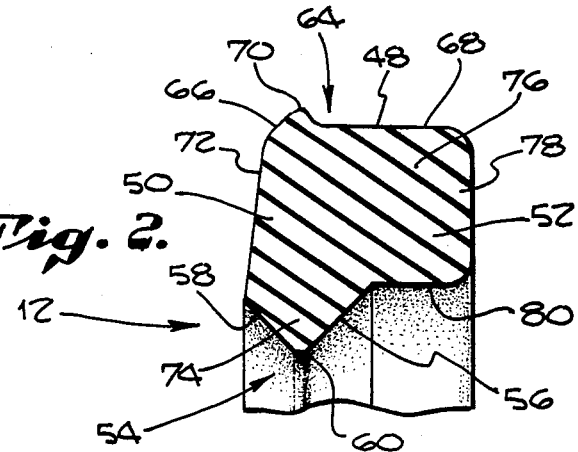
FIG. 2 is a sectional view taken in the II—II plane of the low pressure seal ring shown in FIG. 1.

As best shown in FIG. 2, the preferred low pressure seal ring 12 in accordance with the present invention includes an annular seal ring body 48 which includes a seal lip portion 50 and a seal body portion 52. The seal ring 12 is shown in the relaxed condition prior to its being compressed as shown in FIG. 3. The seal lip portion 50 includes a bottom seal lip surface shown generally at 54 which is sized so that it is partially supported by the seal lip support surface 40 on the high pressure seal ring 14, as best shown in FIG. 3.

The seal lip bottom surface 54 includes a first inclined surface 56 and a second inclined surface 58. The first inclined surface 56 is designed to contact and rest upon the seal lip support surface 40. The first inclined surface extends out past the high pressure seal ring apex 42 and meets the second inclined surface 58 to form apex 60. This provides a bottom seal lip surface 54 having a V-shaped cross section with the apex 60 at the bottom thereof. The first inclined surface 56 is sized so that the apex 60 is positioned to the left of the high pressure seal ring apex 42 for sealing contact with the piston outer surface 22.

The V-shaped cross-sectional configuration of the lower part of seal lip portion 50 reduces the amount of movement of the seal lip during reciprocating of piston 18, to thereby reduce the degree to which the seal lip bottom surface 56 is abraded against the high pressure seal apex 42.

The seal lip portion 50 includes a top seal lip surface shown genereally at 64. The top seal lip surface includes an annular lobe portion 66, which protrudes radially outward past the outer surface of seal body 68. The annular lobe 66 includes an apex 70. The annular lobe 66 to provides increased localized pressure and increased sealing contact between the outer surface of the seal lip and the groove bottom 28. It is preferred that the annular lobe 66 extend outward past the seal body outer surface 68, so that when the seal is compressed within the cylinder groove, as shown in FIG. 3, there is an additional compressive force exerted on seal lip portion 50, between apex 60 and 70 due to the protrusion of lobe 66 above seal body surface 68. Preferably, lobe portion 66 will have an axial width less than the width of the V-shaped lip bottom 74. It is also preferred that sidewall 72 slope outward between lobe portion 66 and V-portion 74. This particular configuration is desirable since it promotes reduced lateral or axial movement of the apex 60 during reciprocation of piston 18 to thereby reduce the abrasion of the low pressure seal apex 60 against the high pressure seal apex 42. The apex 70 of the annular lobe is preferably located radially directly above the bottom seal lip apex 60 as shown in FIG. 2. If desired, the apex 70 of the lobe 66 may be displaced slightly to the left or right from the position shown in FIG. 2.

The seal body portion 52 includes a left part 76, which is integral with and merges into the seal lip portion 50. The seal body portion 52 also includes a right part 78. The seal body portion 52 further includes an inner surface 80 which is designed to seat against seal body support surface 44 to provide biasing force against the high pressure seal 14. As is conventionally known, the radial width of low pressure seal ring 12 is chosen to be slightly larger than the radial distance between the groove bottom 28 and high pressure seal ring 16. This provides compression of the low pressure seal ring 12 when it is mounted within the groove 26 so that the seal body portion 52 and first inclined surface 56 bias the high pressure seal ring 14 against piston surface 22 and so that the seal lip apex 60 is also biased against piston surface 22. As is well known, the degree of biasing force against high pressure seal ring 14 and against the piston 18 can be varied at no load conditions by increasing or decreasing the radial width of the low pressure ring 12. The degree to which the low pressure seal ring is oversized will depend upon the particular elastomer being used and the desired biasing pressures of the seal body portion 52 against high pressure seal 16 and the degree of desired biasing pressure of apex 60 and pressure ridge 62 against the piston 22 during low pressure sealing. The low pressure seal 12 is preferably made from conventional materials such as natural rubber, synthetic rubber or other materials having similar characteristics that are commonly used as the low pressure seal ring in this type of multi-element seal assembly.

A cam ring 16 is preferably provided as shown in FIGS. 1 and 3 for biasing the low pressure seal ring apex 60 axially away from the high pressure seal ring apex 40. The use of a cam ring, such as cam ring 16, in conjunction with low pressure and high pressure seal ring assemblies is well known and discussed in detail in my previously referenced patents. The function of cam ring 16 in the present seal assembly serves the same function as the conventional well-known cam ring previously discussed. Although a cam ring is not essential in providing adequate high and low pressure sealing performance of the multi-element seal assembly, it is preferably included as part of the seal assembly.

Having thus described exemplary embodiments of the present invention, it should be noted by those skilled in the art that the within disclosures are exemplary only and that various other alternatives, adaptations and modifications may be made within the scope of the present invention. By way of example, and not of limitation, a plurality of pressure ridges may be used instead of a single pressure ridge, as shown in the preferred embodiment.

Accordingly, the present invention is not limited to the specific embodiment as illustrated herein, but is only limited to the following claims.

What is claimed is:

1. A low pressure seal ring adapted for use in combination with a high pressure seal ring to provide a seal assembly which is capable of sealing first and second relatively reciprocating surfaces at both high and low pressures, wherein said high pressure seal ring includes an inner sealing surface for sealing contact with said first reciprocating surface and a low pressure seal ring support portion, said low pressure seal ring support portion including an outer low pressure seal ring support surface having an inclined seal lip support surface which tapers inward towards said inner sealing surface, said seal lip support surface having a left end which terminates at said inner sealing surface to provide a high pressure seal apex adjacent said first reciprocating surface and a right end, said low pressure seal ring support surface further including an axial low pressure seal body support surface which is substantially parallel to said inner sealing surface, said seal body support surface having a left end which meets the right end of said seal lip support surface, wherein said low pressure seal ring comprises an annular seal ring body comprising:
    a seal lip portion having a bottom seal lip surface adapted to be supported by the seal lip support surface of said high pressure seal ring, said seal lip surface including an annular sealing tip at its left end said sealing tip extending out past and adjacent to the left end of said seal lip suppport surface for sealing contact with said first reciprocating surface, said seal tip including a first apex, said seal lip portion further including a top seal lip surface, said top seal lip surface including an annular lobe having a second apex, said first and second apexes providing increased sealing contact between said low pressure seal lip and first and second reciprocating surfaces; and
    a seal body portion having a left part integral with said seal lip portion and a right part, said seal body portion adapted to be positioned between the groove bottom and the seal body support surface of said high pressure seal ring for biasing said high pressure seal ring against said second reciprocating surface.

2. A low pressure seal ring according to claim 1 wherein said first and second apexes are radially opposite each other.

3. A low pressure seal ring according to claim 1 wherein said bottom seal lip surface includes a first inclined surface adapted to contact the seal lip support surface of said high pressure seal ring and a second inclined surface which meets said first inclined surface to form a bottom seal lip surface having a V-shaped cross section with said first apex at the bottom of said V-shape.

4. A low pressure seal ring according to claim 1 wherein said seal body portion includes an outer surface for contact with the groove bottom and wherein said annular lobe on said top seal lip surface extends radially outward past said seal body outer surface when said seal body is in a relaxed condition.

5. A seal assembly for providing a seal between first and second reciprocating surfaces at both high and low pressures wherein said second surface includes an annular groove in which said seal assembly is housed said groove having a bottom, side surfaces and an open top, said seal assembly comprising:
    a high pressure seal ring having an inner sealing surface for sealing contact with the first reciprocating surface and a low pressure seal ring support portion, said low pressure seal ring support portion including an outer low pressure seal ring support surface having an inclined seal lip support surface which tapers inward towards said inner sealing surface, said seal lip support surface having a left end which terminates at said inner sealing surface to provide a high pressure seal apex adjacent said first reciprocating surface and a right end, said low pressure seal ring support surface further including an axial low pressure seal body support surface which is substantially parallel to said inner sealing surface, said seal body support surface having a left end which meets the right end of said seal lip support surface; and
    a low pressure seal ring located between said groove bottom and the low pressure seal ring support surface of said high pressure seal ring, said low pressure seal ring including an annular seal ring body comprising:
    a seal tip portion having a bottom seal lip surface adapted to be supported by the seal lip support surface of said high pressure seal ring, said seal lip surface including an annular seal tip at its left end said sealing tip extending out past and adjacent to the left end of said seal lip support surface for sealing contact with said first reciprocating surface, said seal lip tip including a first apex and said seal lip portion further including a top seal lip surface, said top seal lip surface including an annular lobe having a second apex, said first and second apexes providing increased sealing contact between said low pressure seal lip and said first and second reciprocating surfaces; and a seal body portion having a left part integral with said seal lip portion and a right part, said seal body portion adapted to be positioned between the groove bottom and the seal body support surface of said high pressure seal ring.

6. A seal assembly according to claim 5 wherein said first and second apexes are radially opposite each other.

7. A seal assembly according to claim 5 wherein said bottom seal lip surface includes a first inclined surface adapted to contact the seal lip support surface of said high pressure seal ring and a second inclined surface which meets said first inclined surface to form a botom seal lip surface having a V-shaped cross section with said first apex at the bottom of said V-shape.

8. A seal assembly according to claim 5 wherein said seal body portion includes an outer surface for contact with the groove bottom and wherein said annular lobe on said top seal lip surface extends radially outward past said seal body outer surface when said seal body is in a relaxed condition.

* * * * *